(12) United States Patent
Pontes

(10) Patent No.: US 6,557,494 B2
(45) Date of Patent: May 6, 2003

(54) PET TOY

(76) Inventor: Regina M. Pontes, 27 Jeffrey Rd., Arlington, MA (US) 02474

( * ) Notice: Subject to any disclaimer, the term of this patent is extended or adjusted under 35 U.S.C. 154(b) by 0 days.

(21) Appl. No.: 09/785,595

(22) Filed: Feb. 16, 2001

(65) Prior Publication Data

US 2001/0047770 A1 Dec. 6, 2001

Related U.S. Application Data

(60) Provisional application No. 60/183,125, filed on Feb. 17, 2000.

(51) Int. Cl.[7] .............................................. A01K 29/00
(52) U.S. Cl. ........................................ 119/707; 119/702
(58) Field of Search ................................ 119/702, 707, 119/711, 28.5; 5/636, 639, 641, 645; D30/118; D6/601

(56) References Cited

U.S. PATENT DOCUMENTS

| | | | | |
|---|---|---|---|---|
| 2,775,222 A | * | 12/1956 | Kruck | 119/482 |
| 3,648,403 A | | 3/1972 | Gommel | |
| 3,902,456 A | * | 9/1975 | David | 119/28.5 |
| 3,989,008 A | | 11/1976 | Neumann | |
| 4,742,799 A | * | 5/1988 | Schlitz | 119/707 |
| 5,188,059 A | | 2/1993 | Rice | |
| D381,234 S | * | 7/1997 | Lupoff | D12/133 |
| 5,682,838 A | * | 11/1997 | Reich | 119/709 |
| D397,900 S | * | 9/1998 | Besen | D21/611 |
| 6,014,950 A | * | 1/2000 | Rogers | 119/710 |
| 6,155,905 A | * | 12/2000 | Truax | 119/707 |
| D443,116 S | * | 5/2001 | Badler | D30/118 |
| 6,305,318 B1 | * | 10/2001 | Ford | 119/28.5 |

* cited by examiner

Primary Examiner—Charles T. Jordan
Assistant Examiner—Judith A. Nelson
(74) Attorney, Agent, or Firm—Pandiscio & Pandiscio

(57) ABSTRACT

A toy for an animal, the toy having a first flexible sheet having a first outer periphery; a second flexible sheet having a second outer periphery; and connectors for joining at least three portions of the first and second sheets, the portions being located adjacent to the first outer periphery of the first sheet and the second outer periphery of the second sheet, the connectors forming openings between each of the portions, and the connectors forming a cavity between the first flexible sheet and the second flexible sheet, the cavity being formed within the portions joined to one another, and the openings having a given length defined by the size of each of the connectors and the total number of the connectors; wherein the openings are sized to permit passage of a favorite object therethrough.

17 Claims, 9 Drawing Sheets

PET TOY

This application claims the benefit of Provisional Application No. 60/183,125, filed Dec. 17, 2000.

FIELD OF THE INVENTION

This invention relates to pet toys in general, and more particularly to pet toys permitting insertion and withdrawal of a favorite object.

BACKGROUND OF THE INVENTION

A variety of pet toys have been developed over time to entertain pets. Ideally, a pet toy is designed to intellectually stimulate, challenge and entertain a pet by allowing the animal to incorporate its instincts into its playtime. Such a pet toy may also provide physical exercise for the pet.

SUMMARY OF THE INVENTION

One object of the present invention is to provide a novel pet toy.

Another object of the present invention is to provide a toy for an animal in which a favorite object is placed inside a cavity in the toy and the animal is able to retrieve the favorite object from the cavity through one of several openings.

And another object of the invention is to provide a pocket for holding a favorite object, the pocket being located within the interior of the cavity.

Still another object of the invention is to provide a replaceable catnip bag in the pocket.

Yet another object of the invention is to provide a pet toy constructed from a flexible material.

And still another object of the invention is to provide a pet toy constructed of a flexible material such as a highly durable fabric.

And yet another object of the invention is to provide a pet toy which an animal can play with independently of a human.

And another object of the invention is to provide a pet toy which can also serve as a bed.

These and other objects of the present invention are addressed by the novel pet toy.

In accordance with one aspect of the present invention, there is provided a pet toy comprising a first flexible sheet having a first outer periphery; a second flexible sheet having a second outer periphery; and connectors for joining at least three portions of the first and second sheets, the portions being located adjacent to the first outer periphery of the first sheet and the second outer periphery of the second sheet, the connectors forming openings between each of the at least three portions, and the connectors forming a cavity between the first flexible sheet and the second flexible sheet, the cavity being formed within the at least three portions joined to one another, and the openings having a given length defined by the size of each of the connectors and the total number of the connectors; wherein the openings are sized to permit passage of a favorite object therethrough.

BRIEF DESCRIPTION OF THE DRAWINGS

The above and other objects and features of the present invention will be more fully disclosed in, or rendered obvious by, the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

FIGS. 1–9 illustrate a preferred embodiment of the present invention.

Figure 1:
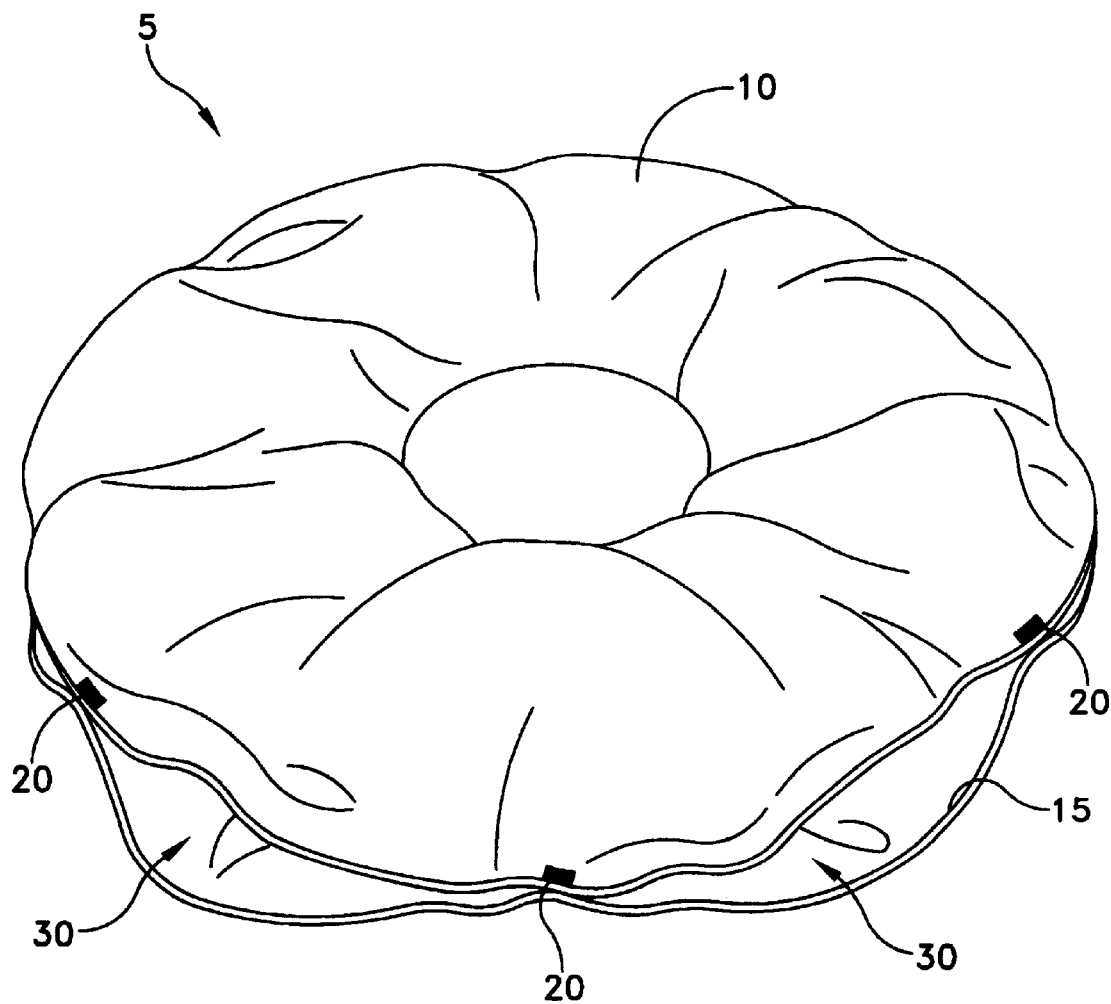
FIG. 1 is an elevational view showing one form of a flexible pet toy having two pillows forming several openings for the passage of a favorite object therethrough.

Looking now at FIG. 1, there is shown a pet toy 5 having a first flexible sheet 10 and a second flexible sheet 15. In a preferred embodiment, and as shown in FIG. 1, first flexible sheet 10 comprises a soft pillow and second flexible sheet 15 comprises a soft pillow, so as to form a bed as well as a pet toy. First sheet 10 and second sheet 15 are each circular in shape. In other preferred embodiments, first sheet 10 and second sheet 15 are shaped in various other forms including, but not limited to, cats, dogs, fish, other animals, bones, mail carriers, rectangles, squares and octagons. As shown, first sheet 10 and second sheet 15 are similarly sized and shaped relative to one another. In other embodiments, they may be differently sized and/or shaped relative to one another.

Figure 2:
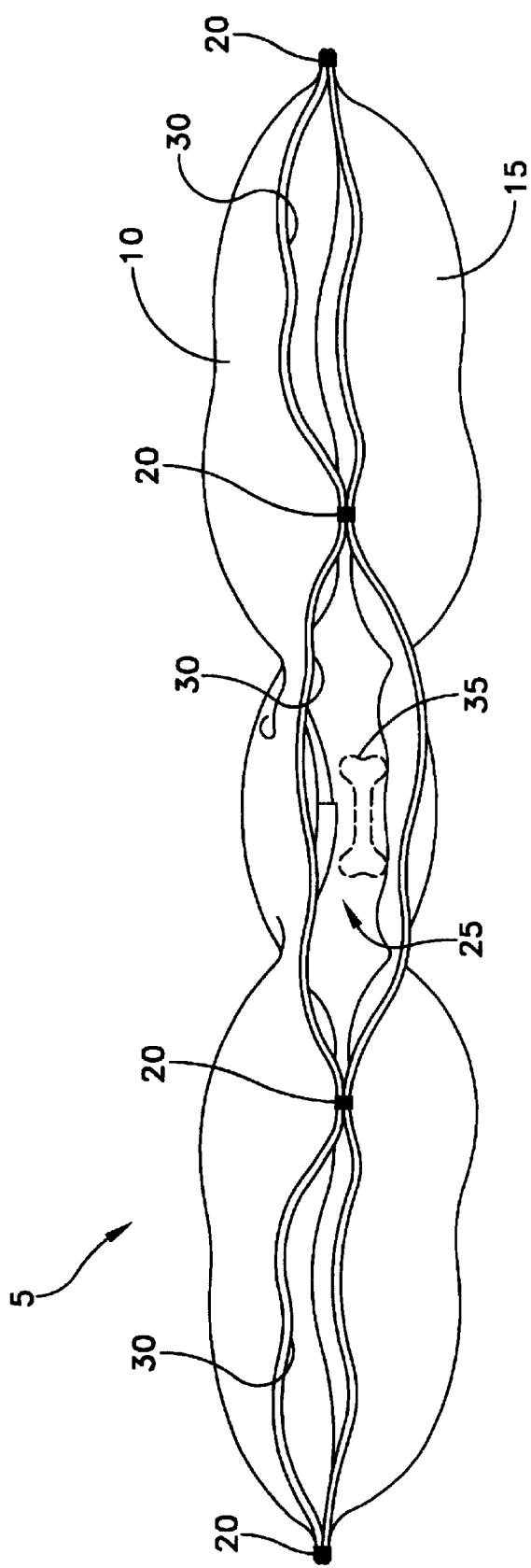
FIG. 2 is an elevational view of the interior portion of one of the pillows of FIG. 1 showing a pocket formed thereon.

Looking at FIGS. 1 and 2, connectors 20 are shown joining first sheet 10 to second sheet 15. Generally, connectors 20 are placed adjacent to, and join together, the perimeters of first sheet 10 and second sheet 15. The placement of connectors 20 creates a cavity 25 (FIG. 2) internal to the connectors 20. Connectors 20 also create several openings 30 therebetween. These openings lead to the interior of cavity 25.

Figure 3:
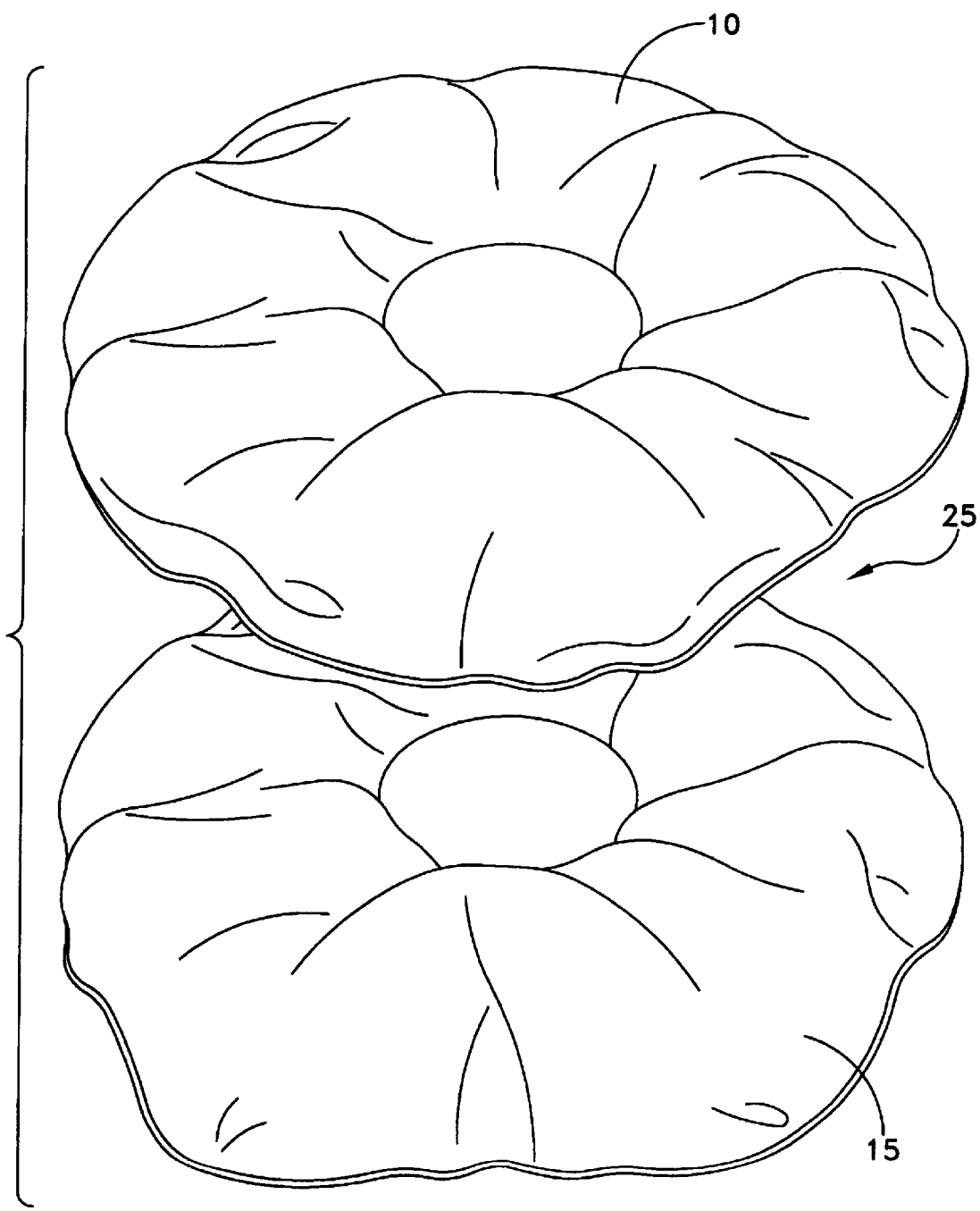
FIG. 3 is an exploded view showing the two pillows of FIG. 1 and a cavity formed therebetween.

Looking at FIG. 3, shown in exploded view are first sheet 10 and second sheet 15 with cavity 25 therebetween.

Looking again at FIGS. 1 and 2, connectors 20 include using thread, or a similar material, for tacking first pillow 10 to second pillow 15. In another preferred embodiment, connectors 20 include a zig-zag stitch to attach first sheet 10 to second sheet 15. And in another preferred embodiment, connectors 20 may include other types of fasteners of the sort generally known in the fastener art.

In use, a favorite object 35 is placed inside cavity 25 of pet toy 5 through one of the openings 30. A pet (not shown), such as a dog or a cat, then tries to remove the favorite object 35 by inserting its paws and/or teeth into one of the openings 30. The size of openings 30 is therefore important; if they are too small, it is difficult to place the favorite object within the cavity 25; if they are too large, the pet is not sufficiently challenged in its effort to extract the favorite toy from cavity 25.

To change the size of one or more of the openings 30, the length or number of connectors 20 may be changed. For example, connectors 20 may be made longer, or additional connectors 20 may be provided, so as to decrease the size of the openings 30. Alternatively, connectors 20 may be shortened, or fewer connectors 20 may be provided, so as to increase the size of the openings 30. This change in the size of openings 30 acts to change which sized objects and sized animals may use the toy 5 and also determines the level of difficulty that exists in passing objects into and out of the inner cavity 25.

Figure 4:
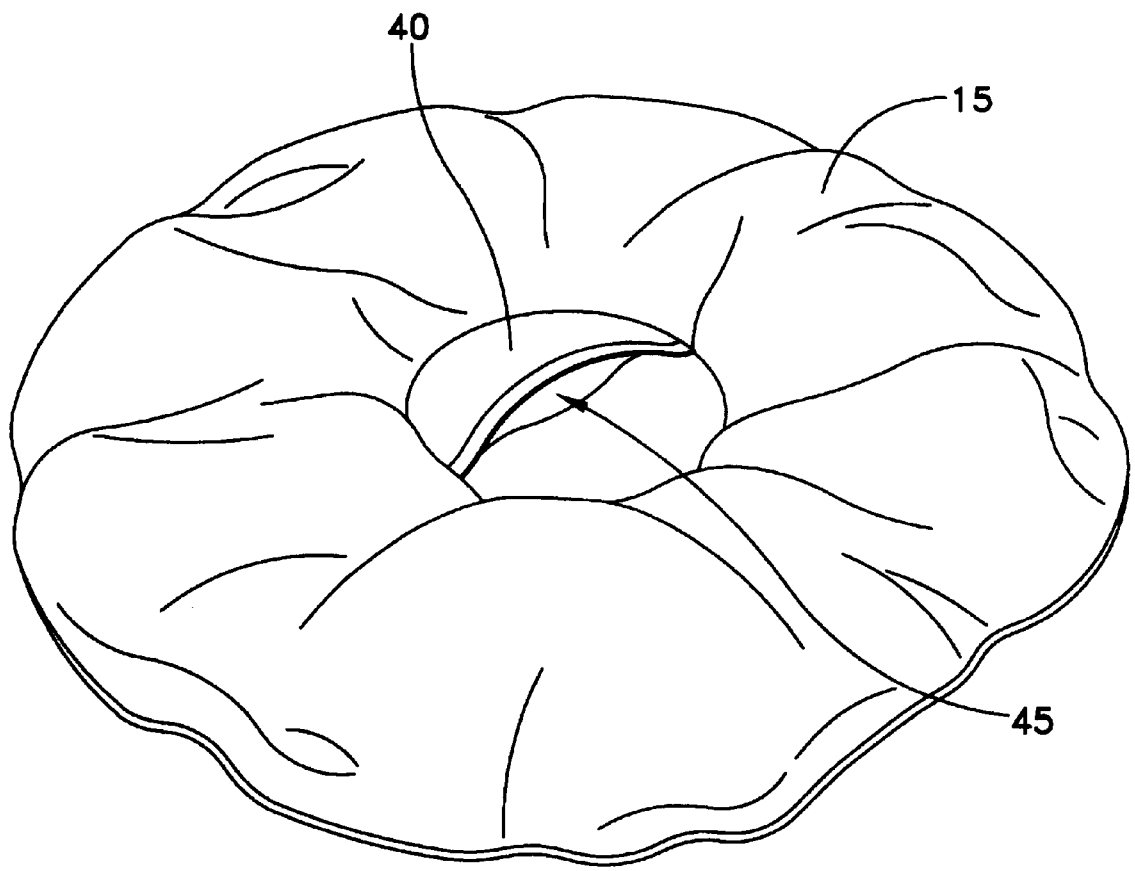
FIG. 4 is a side elevational view of the pet toy of FIG. 1 showing a favorite object 40 placed in the cavity.
Figure 5:
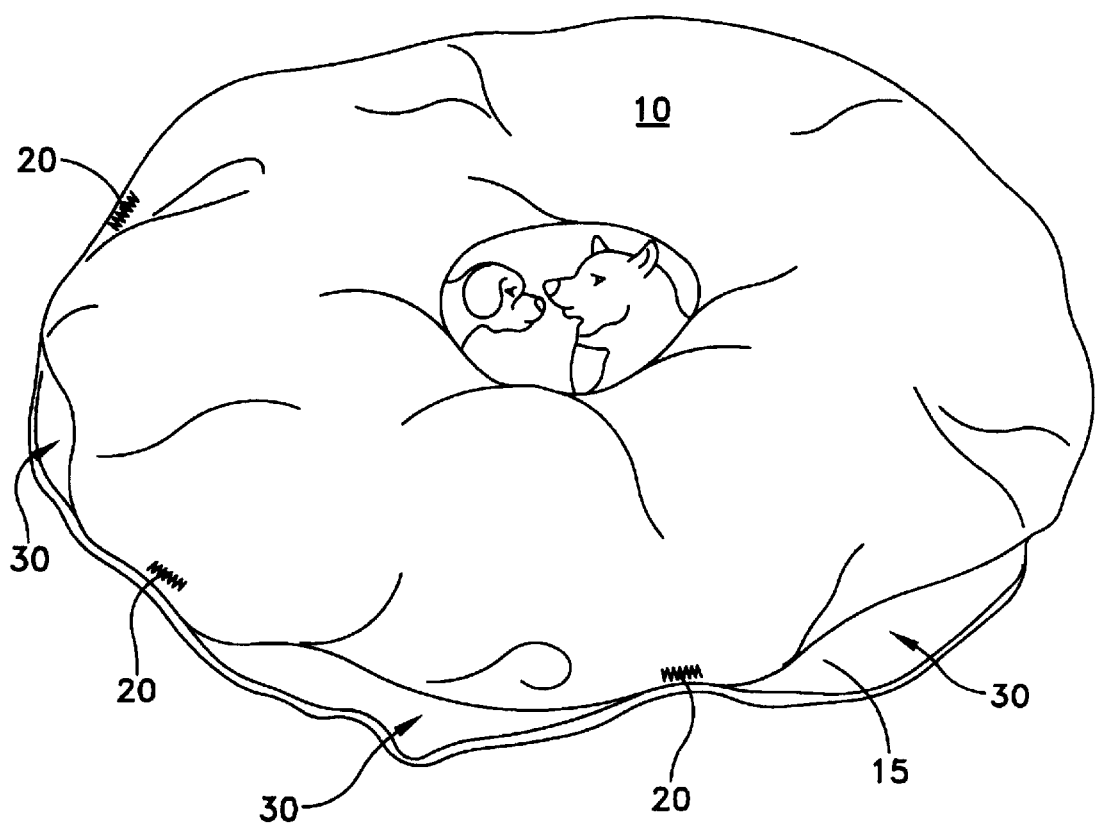
FIGS. 5–9 are photographs showing the pet toy illustrated in FIG. 1.
Figure 6:
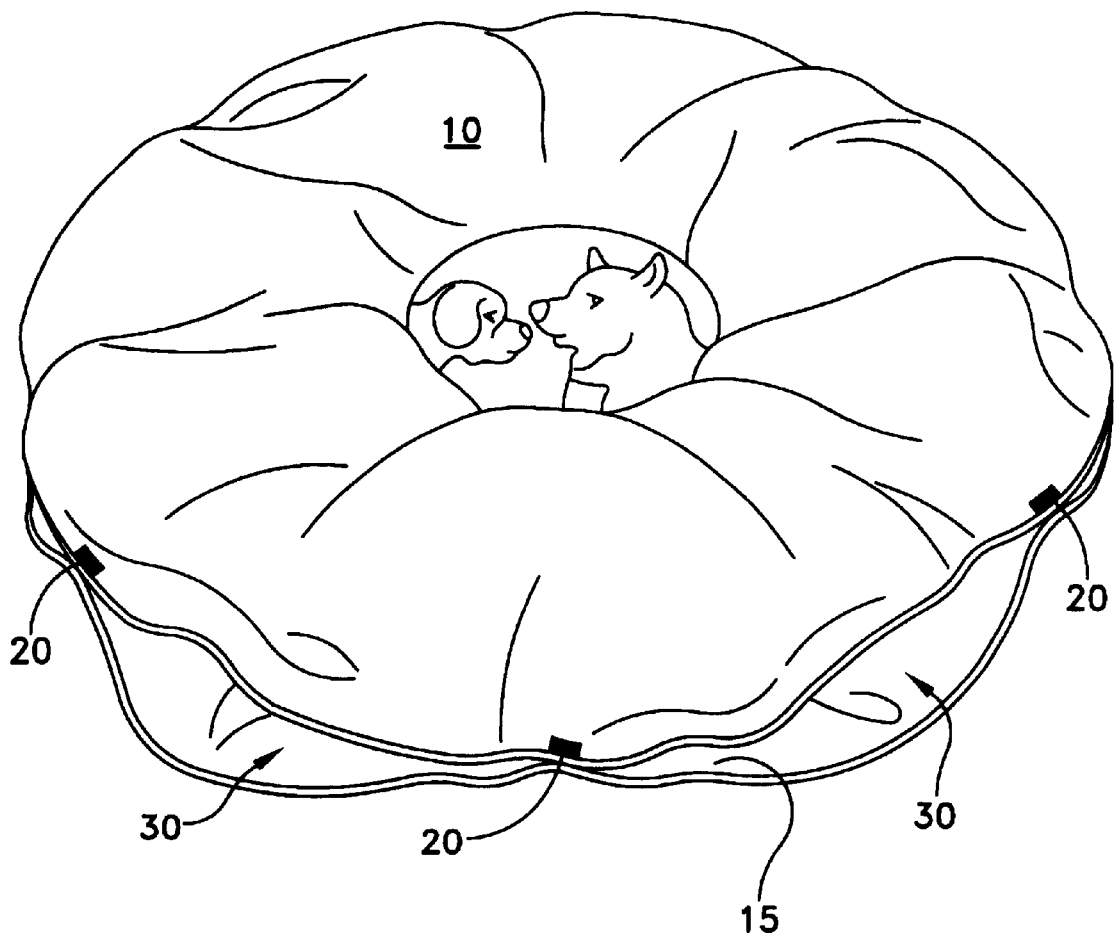
Figure 7:
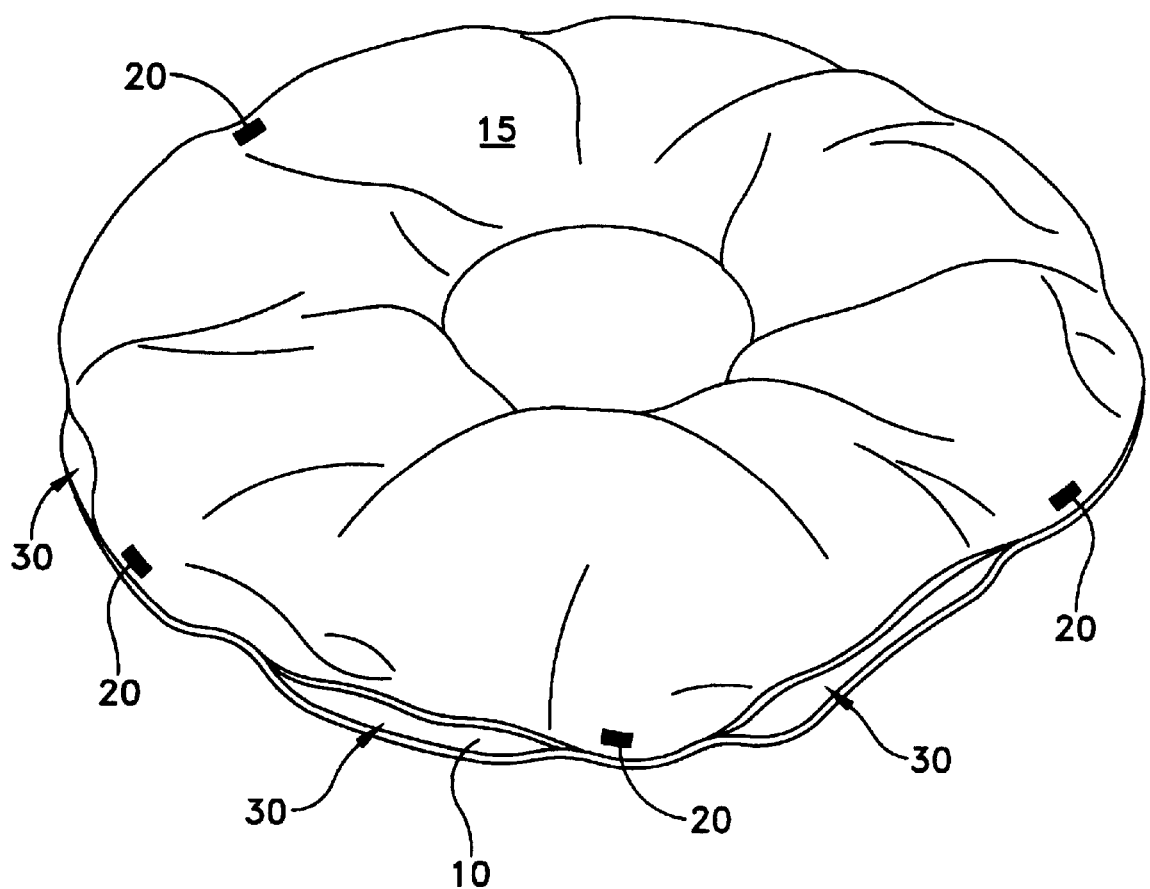
Figure 8:
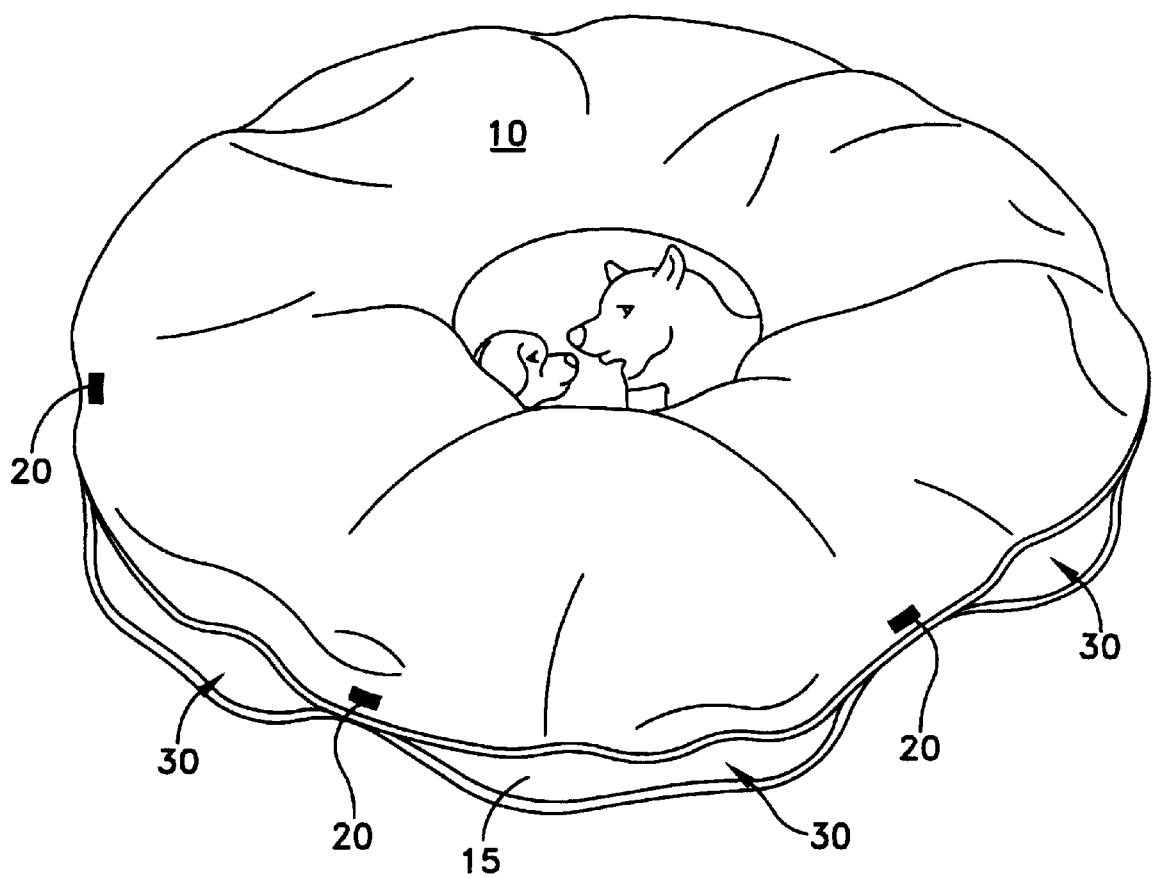
Figure 9:
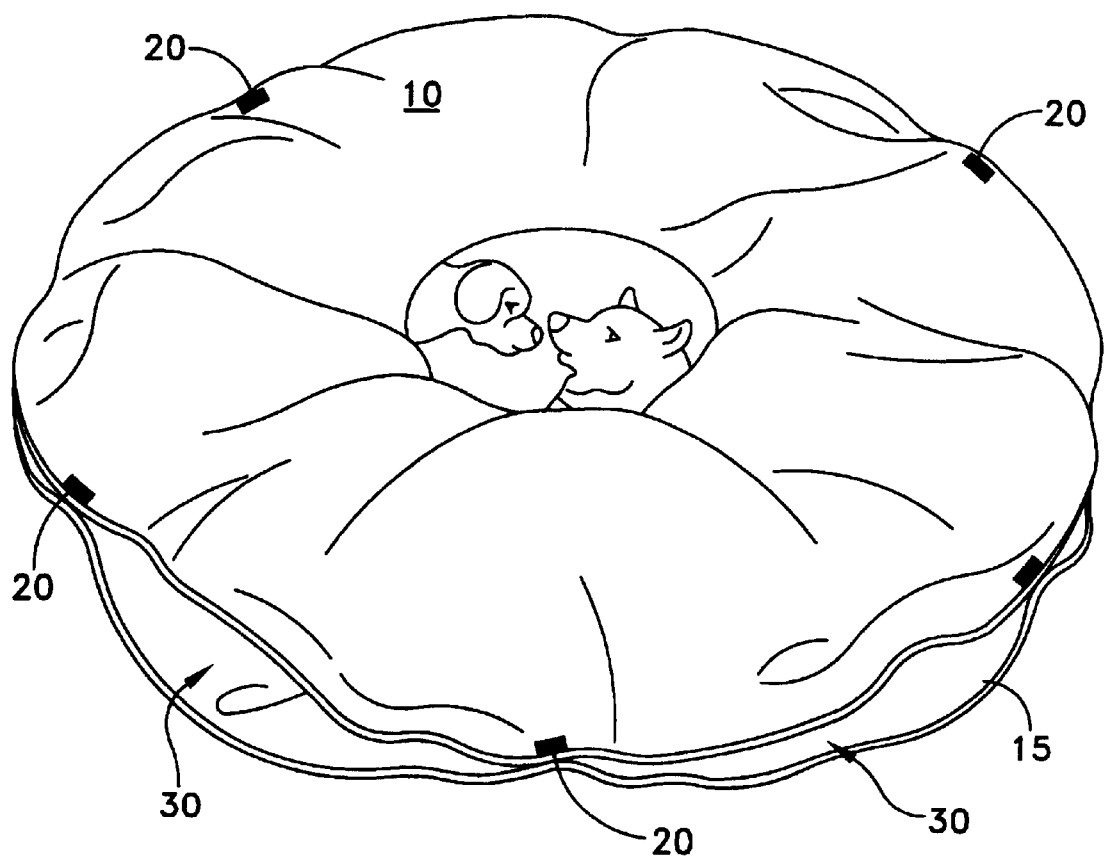

Now looking at FIG. 4, a pocket 40 is shown formed in first sheet 10 inside cavity 25. Pocket 40 has a passage 45 to permit the temporary placement of a favorite object, such as a bag of catnip (not shown) or a favorite object. Placement within pocket 35 is such that the animal can sense the presence of the favorite object through smell or touch but cannot remove the object. This heightens the animal's desire to find the favorite object and thus play with pet toy 5. The object may be removed from, and replaced into, pocket 40 by a human.

In an alternative embodiment (not shown), at least a portion of first sheet 10 is translucent or transparent, instead of opaque, so as to allow an animal to see an image of an object, or the object itself, in cavity 25.

First sheet 10 and second sheet 15, or other similar structures forming pet toy 5, are formed of a flexible material and have several openings 30 to provide a challenge to the animal trying to retrieve an object contained within. The flexible material increases the difficulty of extraction of an object because pet toy 5 cannot be simply rolled about by the animal until the object falls out. The number of openings 30 also increases the challenge to the animal as it must make a decision from which one of the openings 30 to try to extract the object.

Looking at FIGS. 5–9, there is shown photographs of pet toy 5 as described herein.

Numerous further variations, alterations, modifications and other derivatives of the present invention will occur and/or become obvious to those skilled in the art in view of the foregoing detailed description of the preferred embodiments of the present invention. Accordingly it is to be understood that the foregoing specification and the appended drawings are intended to be illustrative only, and not as limiting of the invention.

What is claimed is:

1. A toy for an animal, said toy comprising:

a first flexible sheet having a first outer periphery;

a second flexible sheet having a second outer periphery; and connectors joining at least three portions of said first and second flexible sheets, said at least three portions being located adjacent to said first outer periphery of said first sheet and said second outer periphery of said second sheet, said connectors forming an opening between each of said at least three portions, and said connectors forming a cavity between said first flexible sheet and said second flexible sheet, said cavity being formed within said at least three portions joined to one another, and said openings having a given length defined by the size of each of said connectors and the total number of said connectors;

wherein said openings are sized to permit passage of a favorite object therethrough.

2. The toy of claim 1 wherein said first flexible sheet is a given shape, and said second flexible sheet is a similar shape to said given shape of said first flexible sheet.

3. The toy of claim 2 wherein said first flexible sheet and said second flexible sheet are of equal size to one another.

4. The toy of claim 3 wherein said first flexible sheet and said second flexible sheet are circular in shape.

5. The toy of claim 1 wherein said first flexible sheet and said second sheet are of different shapes.

6. The toy of claim 1 wherein said first flexible sheet further comprises a first pillow.

7. The toy of claim 6 wherein said second flexible sheet further comprises a second pillow.

8. The toy of claim 1 wherein said connectors are sewing thread tackings.

9. The toy of claim 1 wherein at least one of said first flexible sheet and said second flexible sheet forms a pocket therein, respectively.

10. The toy of claim 9 wherein said first flexible sheet has an inner surface and an outer surface, said inner surface forms said cavity, and said inner surface contains said pocket.

11. The toy of claim 9 wherein said pocket opens into said cavity.

12. The toy of claim 1 further comprising a squeaker element in said first flexible sheet, wherein sound is emitted from said toy when said animal steps on said first flexible sheet, and wherein sound is emitted from said toy when said animal bites said first flexible sheet.

13. The toy of claim 1 wherein said first flexible sheet contains an opening therethrough.

14. The toy of claim 13 wherein said second flexible sheet contains an opening therethrough.

15. The toy of claim 6 wherein said first pillow contains an opening therethrough.

16. The toy of claim 7 wherein said second pillow contains an opening therethrough.

17. The toy of claim 16 wherein said first pillow contains an opening therethrough.

* * * * *